United States Patent [19]

Segal

[11] B 3,924,614

[45] Dec. 9, 1975

[54] BASE TWO EXPONENTIAL COUNTER

[75] Inventor: Joshua L. Segal, Chelmsford, Mass.

[73] Assignee: The United States of America as represented by the Secretary of the Air Force, Washington, D.C.

[22] Filed: Oct. 17, 1973

[21] Appl. No.: 407,357

[44] Published under the Trial Voluntary Protest Program on January 28, 1975 as document no. B 407,357.

[52] U.S. Cl. ....................... 328/51; 328/41; 328/42; 235/92 CC; 340/347 DD

[51] Int. Cl.$^2$ ........................................... H03K 21/18

[58] Field of Search ................... 328/42, 41, 48, 51; 235/92 CC, 92 PL, 92 MB; 340/347 DD

[56] References Cited

UNITED STATES PATENTS

| | | | |
|---|---|---|---|
| 3,430,201 | 2/1969 | Kintner | 235/92 CC |
| 3,571,576 | 3/1971 | Satterfield | 235/92 CC |
| 3,594,560 | 7/1971 | Stanley | 340/347 DD |
| 3,646,371 | 2/1972 | Flad | 328/51 X |
| 3,657,658 | 4/1972 | Kubo | 328/48 X |

*Primary Examiner*—John S. Heyman
*Attorney, Agent, or Firm*—Harry A. Herbert; Julian L. Siegel

[57] ABSTRACT

A system for base two exponential counting into a digital storage system. Each stage of a binary bit counter enables a strobe gate with each strobe gate then setting one of a series of combination logic and counting flip-flops. The negative output of each of these flip-flops sets one each of a series of inhibit flip-flops and the negative output of each of the inhibit flip-flop needs a corresponding strobe gate and also activates a binary counter.

1 Claim, 1 Drawing Figure

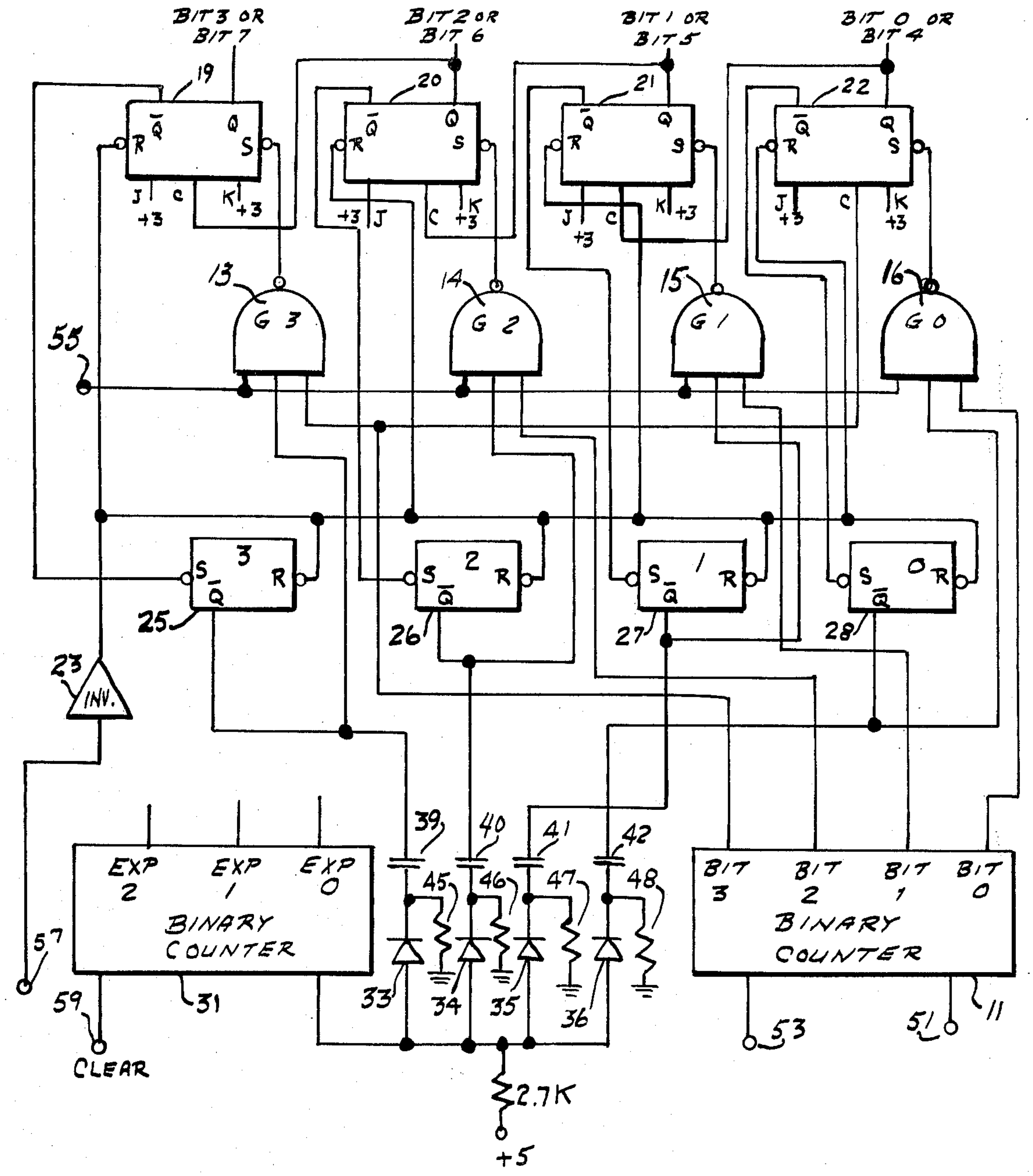
BIT 3 OR BIT 7
BIT 2 OR BIT 6
BIT 1 OR BIT 5
BIT 0 OR BIT 4
G 3
G 2
G 1
G 0
INV.
EXP 2
EXP 1
EXP 0
BINARY COUNTER
BIT 3
BIT 2
BIT 1
BIT 0
BINARY COUNTER
CLEAR
2.7K
+5

BASE TWO EXPONENTIAL COUNTER

BACKGROUND OF THE INVENTION

This invention relates to digital storage systems, and more particularly to a base two binary exponential counter.

When inputting a large number of channels of counting or scaler data into a computer or mass storage system, much time as well as storage space can be saved by compacting a large number into one storage location. If the data has a Poisson Distribution, the standard deviation of a number, $n$, in the pulse counting mode is $\sqrt{n}$. It would follow that in a floating point number $n$, of $x$ significant bits, a truncation of half or less of these $x$ least significant bits of a given $n$ would result in a reduction in accuracy of less than one standard deviation.

The counter disclosed here as an embodiment of the invention is 7 bits, 3 in the exponent counter and 4 in the binary counter. By adding the corresponding repetitive circuitry this arrangement could easily be extended to 18 bits (4 exponent and 14 binary counting) or 16 bits (4 exponent and 12 binary counting).

SUMMARY OF THE INVENTION

A base two exponential counter with near zero dead time between successive counting periods is presented in this invention. The counter allows a counting capability of $2^{29}$ for an 18 bit word length or $2^{26}$ for a a 16 bit word length. For an 18 bit computer word, 14 bits of counting and 4 exponent bits are used. The total accuracy of 14 significant bits is maintained and accuracy of a number, $n$, is always better than or equal to $\pm \sqrt{n}$.

It is therefore an object of the invention to provide a novel and improved base 2 exponential counter for use in digital computing apparatus.

It is another object to provide a base two exponential counter that requires only one storage location per channel.

It is another object of the invention to provide a base two exponential counter in which the time to store the desired number is one-tenth of the time required in prior art digital counting systems.

It is yet another object of the invention to provide a base two exponent counter in which the dead time between successive scaling counting periods can be less than 80 ns.

These and other objects, advantages and features of the invention will become more apparent from the following description taken in connection with the illustrative embodiments in pg,3 the accompanying drawing.

DESCRIPTION OF THE DRAWING

The sole FIGURE is a block diagram showing an embodiment of the invention.

DETAILED DESCRIPTION OF THE PREFERRED EMBODIMENT

Referring now to the drawing, the base 2 exponential counter includes binary counter 11 with four stages for bits 0 through 3. An example of such a counter is shown and described in "Pulse, Digital, and Switching Waveforms," by Millman and Taub, pages 668–671, published by McGraw Hill. Each of the outputs of binary counter 11 forms one of the inputs to strobe or AND gates 13–16. Strobe gates 13-16 are each fed to the set terminals of flip-flops 19–22 which are combination latch and counting flip-flops i.e., they are combinations of the JKC type with the C input terminal used for complementing the output and the RS type with set and reset input terminals. The negative output or Q of each of the flip-flops 19–22 are then fed to the set terminals of one each of the inhibit flip-flops 25–28 are the RS type. The positive or Q output of flip-flops 19–22 can be used for readout and these flip-flops can be cleared by applying a pulse at terminal 57 to the rest terminals through inverter 23. The negative or $\overline{Q}$ outputs of each inhibit flip-flops 25– 28 feed one each to strobe gates 13–16 and also activate binary counter 31 which has three stages for counting exponent bits 0–2. The activating signals to counter 31 from inhibit gates 25–28 are fet through steering diodes 33–36 and resistance-capacitance combinations including capacitors 39–42 and grounded resistors 45–48.

Four command pulses are used in the present embodiment of the invention. The input pulses to be counted are fed to terminal 51 of binary counter 11 and this counter is reset by applying a pulse at terminal 53. Significant bits are strobed into latch flip-flops 19–22 through strobe gates 13–16 by a pulse applied to terminal 55. Clearing pulses to rest flip-flops 19–22, inhibit flip-flops 25–28 and exponent counter 31 are applied at terminal 57 and the reset terminal 59.

TABLE 1

| $E_2$ | $E_1$ | $E_0$ | $B_z$ | $B_y$ | $B_x$ | $B_w$ |
|---|---|---|---|---|---|---|
| 0 | 0 | 0 | $B_3$* | $B_2$ | $B_1$ | $B_0$ |
| 0 | 0 | 1 | ↓ | ↓ | $B_1$ | $B_4$* |
| 0 | 1 | 0 | ↓ | $B_2$ | $B_5$ | ↓ |
| 0 | 1 | 0 | $B_3$ | $B_6$ | ↓ | ↓ |
| 1 | 0 | 0 | $B_7$* | ↓ | ↓ | ↓ |
| 1 | 0 | $B_8$* | ↓ | ↓ | ↓ | ↓ |
| 1 | $B_9$* | $B_8$ | $B_7$ | $B_6$ | $B_5$ | $B_4$ |

The data from this 7 bit counter is presented in a modified exponential format as follows:

$B_z\ B_y\ B_x\ B_w * 10_2\ E_2\ E_1\ E_0$

It is necessary to determine the most significant bit of the number ($n$) which can be easily handled with a short software routing to convert this format to a more convenient arithmetical format.

Table 1 shows the order of significant bits for the described embodiment and Table 2 shows the same for an 18 bit word length. In both tables the most significant bit is noted with an asterisk.

is shown in Table 2. Assume a worst case of 100 Megahertz pulse input rate to the counter which would allow 160 microseconds before these 14 bits are filled with counts and overflow into the latch counting flip-flops. During this 160 microseconds the data must be strobed into the computer and latch counting flip-flops and inhibit flip-flops must be reset. Clearing the flip-flop requires only nanoseconds. The 160 microseconds is a more than adequate time to strobe the data in the computer considering that most computer cycle times are well under 5 $\mu$sec. The dead time between successive

TABLE 2

| $E_3$ | $E_2$ | $E_1$ | $E_0$ | $B_z$ | $B_y$ | $B_x$ | $B_n$ | $B_v$ | $B_u$ | $B_T$ | $B_S$ | $B_R$ | $B_Q$ | $B_P$ | $B_O$ | $B_N$ | $B_M$ |
|---|---|---|---|---|---|---|---|---|---|---|---|---|---|---|---|---|---|
| 0 | 0 | 0 | 0 | $B_{13}^*$ | $B_{12}$ | $B_{11}$ | $B_{10}$ | $B_9$ | $B_8$ | $B_7$ | $B_6$ | $B_5$ | $B_4$ | $B_3$ | $B_2$ | $B_1$ | $B_0$ |
| 0 | 0 | 0 | 1 | | | | | | | | | | | | | $B_1$ | $B_{14}^*$ |
| 0 | 0 | 1 | 0 | | | | | | | | | | | | $B_2$ | $B_{15}^*$ | |
| 0 | 0 | 1 | 1 | | | | | | | | | | | $B_3$ | $B_{16}^*$ | | |
| 0 | 1 | 0 | 0 | | | | | | | | | | $B_4$ | $B_{17}^*$ | | | |
| 0 | 1 | 0 | 1 | | | | | | | | | $B_5$ | $B_{18}^*$ | | | | |
| 0 | 1 | 1 | 0 | | | | | | | | $B_6$ | $B_{19}^*$ | | | | | |
| 0 | 1 | 1 | 1 | | | | | | | $B_7$ | $B_{20}^*$ | | | | | | |
| 1 | 0 | 0 | 0 | | | | | | $B_8$ | $B_{21}^*$ | | | | | | | |
| 1 | 0 | 0 | 1 | | | | | $B_9$ | $B_{22}^*$ | | | | | | | | |
| 1 | 0 | 1 | 0 | | | | $B_{10}$ | $B_{23}^*$ | | | | | | | | | |
| 1 | 0 | 1 | 1 | | | $B_{11}$ | $B_{24}^*$ | | | | | | | | | | |
| 1 | 1 | 0 | 0 | | $B_{12}$ | $B_{25}^*$ | | | | | | | | | | | |
| 1 | 1 | 0 | 1 | $B_{13}$ | $B_{26}^*$ | | | | | | | | | | | | |
| 1 | 1 | 1 | 0 | $B_{27}^*$ | | | | | | | | | | | | | |
| 1 | 1 | 1 | $B_{28}^*$ | $B_{27}$ | $B_{26}$ | $B_{25}$ | $B_{24}$ | $B_{23}$ | $B_{22}$ | $B_{21}$ | $B_{20}$ | $B_{19}$ | $B_{18}$ | $B_{17}$ | $B_{16}$ | $B_{15}$ | $B_{14}$ |

For clarification the following example is given:

The information supplied by scaler is

| $E_2$ | $E_1$ | $E_0$ | $b_z$ | $b_y$ | $b_x$ | $b_w$ |
|---|---|---|---|---|---|---|
| 0 | 1 | 0 | 1 | 1 | 1 | 0 |

which places 3 bits in the exponent counter and 4 bits in the binary counter.

From Table I it is ascertained that $B_3\ B_2\ B_5 * B_4$ and changing to standard exponential format results in $$\begin{matrix} B_5 & B_4 & B_3 & B_2 & * & 10 & E_2 & E_1 & E_0 \\ 1 & 0 & 1 & 1 & * & 10^{010} & & & = 101100 \end{matrix}$$

$$= 44_{10}$$

The actual number counts (n) received by the counter could have been $44 \leq n \leq 47$.

At times $t_0$, assume all flip-flops have been cleared and all counters zeroed. Also the scaler gate (not shown in the FIGURE) is open and ready to pass input pulses to the counter. At $t_1$ the scaler gate is closed. A pulse at terminal 55 strobes significant bits into flip-flops 19–21 through strobe gates 13–16. Binary counters are cleared and counting gate is reopened.

A system with 14 bits of binary counting and 4 exponent bits which is the 18 bit word can also be used and data sets is only the time required for the pulse to strobe significant bits into the latches and the reset pulse, which could be less than 80 nanoseconds.

For a more detailed explanation of the circuit operation between $t_0$ and $t_1$ consider the following three cases for the 7 bit embodiment, less than $2^4$ counts received, greater than $2^4$ but less than $2^8$, and greater than $2^8$ but less than $2^{10}$. Case 1: Less than $2^4$ counts, a. inhibit flip-flops 25–28 and latch flip-flops 19–22 are in the zero state;
b. a pulse at terminal 55 enabling strobe gates 13–16 transfers bits 3 into flip-flops 19–22.

Case 2: Greater than $2^4$ but less than $2^8$, a. when $2^4$ (16th) pulse is received:
   1. inhibit flip-flop 28 is changed to the one state thereby closing gate 16,
   2. a pulse is set via the RC network to exponent counter 31, and
   3. flip-flop 22 now becomes bit 4;
b. when $2^5$ (32nd), $2^6$ (64th), and $2^7$ (128th) pulses are received, steps (1) and (2) above occur for flip-flop 21, inhibit flip-flop 27, and strobe gate 15; flip-flop 21, inhibit flip-flop 27, and strobe gate 14; and flip-flop 19, inhibit flip-flop 25, and strobe gate 13, respectively.

Looking at the specific example of 91 counts, it can be seen that exponent counter 31 has received 3 pulses (on 16, 32, and 64). Inhibit flip-flops 26–28 are set and strobe gates 14–16 are closed.

The pulse at terminal 55 transfers only bit 3 to flip-flop 19 and the information available is as follows:

| EXP2 | EXP1 | EXP0 | BIT3 | BIT6 | BIT5 | BIT4 |
|---|---|---|---|---|---|---|
| 0 | 1 | 1 | 1 | 1 | 0 | 1 |

$1011 \times 10^{00} = 11 \times 2^3 = 88_{10}$ $(88 \leqslant n \leqslant 95)$ which is consistent with Table 1.

Case 3: Greater than $2^8$ but less than $2^{10}$:

In order to make total use of the 7 bits in the described embodiment and still maintain $\pm \sqrt{n}$ accuracy, a dual use is established for EXP0 and EXP1. When bit 7 overflows a pulse is sent to exponent counter 31. Since the maximum allowable exponent is 4 the counter software can determine if the exponent bits are greater than 4. If such is the case, then EXP1 and EXP0 take on the character of BIT 8 and BIT 9. The following example is given:

a. four pulses have been delivered to exponent counter 31 (on 16, 32, 64 and 128)
b. inhibit flip-flops 25–28 are all in the one state
c. strobe gates 13–16 are all inhibited
d. flip-flop 19 overflows and a pulse is sent to the exponent counter (not shown in the FIGURE)
e. EXP0 now behanves as bit 8
f. if and when bit 8 overflows EXP1 acts as bit 9
g. the pulse at terminal 55 transfers no information to latch counting flip-flops.

Using as a specific example of 720, the following number would be strobed into the computer:

| EXP 2 | BIT 9 | BIT 8 | BIT 7 | BIT 6 | T5 | BIT 4 |
|---|---|---|---|---|---|---|
| 1 | 1 | 0 | 1 | 1 | 0 | 1 |

$= 101101 * 10_2^{100} = 45 \times 16 = 720.$
$(720 \leqslant n \leqslant 735)$

What is claimed is:

1. A base two exponential counting circuit comprising:

a. a first plurality of flip-flops, each having set and reset input terminals and a complement terminal;
b. a plurality of AND gates having the outputs thereof connected one each to the set terminals of the plurality of flip-flops, the plurality of AND gates each having a terminal for applying strobe pulses thereto;
c. a second plurality of flip-flops activated by one each of the first plurality of flip-flops, the outputs of the second plurality of flip-flops being connected to one each of the plurality of AND gates for inhibiting said gates;
d. a first binary counter having a plurality of bit outputs, one bit each connected to one of the plurality of AND gates;
e. a plurality of capacitors connected to one each of the outputs of the second plurality of flip-flops;
f. a plurality of steering diodes having one terminal connected to one each of the plurality of capacitors;
g. a plurality of grounded resistors interposed one each between the plurality of capacitors and the plurality of steering diodes; and
h. a second binary counter having an input terminal connected to the plurality of steering diodes, the outputs of the second binary counter representing an exponent count.

* * * * *